United States Patent
Larson et al.

(10) Patent No.: US 10,166,841 B2
(45) Date of Patent: Jan. 1, 2019

(54) VEHICLE CLIMATE CONTROL SYSTEM

(71) Applicant: International Truck Intellectual Property Company, LLC, Lisle, IL (US)

(72) Inventors: Gerald L. Larson, Grand Haven, MI (US); Dean A. Opperman, Plainfield, IL (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 147 days.

(21) Appl. No.: 15/259,809

(22) Filed: Sep. 8, 2016

(65) Prior Publication Data

US 2017/0096048 A1 Apr. 6, 2017

Related U.S. Application Data

(60) Provisional application No. 62/216,210, filed on Sep. 9, 2015.

(51) Int. Cl.
*B60H 1/32* (2006.01)
*B60H 1/00* (2006.01)

(52) U.S. Cl.
CPC ....... *B60H 1/3208* (2013.01); *B60H 1/00785* (2013.01); *B60H 1/00807* (2013.01); *B60H 1/3207* (2013.01); *B60H 2001/3245* (2013.01); *B60H 2001/3283* (2013.01)

(58) Field of Classification Search
None
See application file for complete search history.

(56) References Cited

U.S. PATENT DOCUMENTS

| | | | | |
|---|---|---|---|---|
| 5,058,388 A | * | 10/1991 | Shaw | F24F 3/044 62/93 |
| 6,213,198 B1 | * | 4/2001 | Shikata | B60H 1/00478 165/202 |
| 6,253,841 B1 | * | 7/2001 | Obara | B60H 1/00849 165/204 |
| 6,311,763 B1 | * | 11/2001 | Uemura | B60H 1/00664 165/43 |
| 7,689,341 B2 | | 3/2010 | Miller | |
| 8,141,377 B2 | | 3/2012 | Connell et al. | |
| 8,260,494 B2 | | 9/2012 | Yang et al. | |
| 2006/0142898 A1 | * | 6/2006 | Mirza | B60H 1/00785 700/276 |
| 2008/0066477 A1 | * | 3/2008 | Aoki | B60H 1/00785 62/150 |
| 2009/0039170 A1 | * | 2/2009 | Burns | B60H 1/00785 236/44 A |
| 2009/0193814 A1 | * | 8/2009 | Lofy | B60N 2/5657 62/3.61 |

(Continued)

*Primary Examiner* — Thomas G Black
*Assistant Examiner* — Sze-Hon Kong
(74) *Attorney, Agent, or Firm* — Jeffrey P. Calfa; Mark C. Bach

(57) ABSTRACT

A vehicle climate control system has a control strategy which controls temperature of an evaporator in a refrigeration circuit to achieve a target temperature/relative humidity within a comfort zone which is defined by upper and lower temperature boundaries and upper and lower relative humidity boundaries. Several system embodiments are disclosed, including an all-electric system. All systems operate with improved efficiency.

15 Claims, 13 Drawing Sheets

(56) References Cited

U.S. PATENT DOCUMENTS

| | | | |
|---|---|---|---|
| 2010/0101239 A1* | 4/2010 | LaGrandeur | B60H 1/00478 62/3.3 |
| 2010/0286830 A1* | 11/2010 | Wijaya | B60H 1/3205 700/276 |
| 2012/0160470 A1* | 6/2012 | Misumi | B60H 1/3207 165/287 |
| 2013/0206852 A1* | 8/2013 | Brykalski | F24D 19/1096 237/2 A |
| 2013/0283840 A1* | 10/2013 | Kakizaki | B60H 1/00064 62/276 |
| 2013/0319630 A1* | 12/2013 | Yamamoto | B60H 1/00764 165/42 |
| 2014/0045417 A1* | 2/2014 | Sakamoto | B60H 1/00028 454/143 |
| 2014/0318159 A1* | 10/2014 | Eisenhour | B60H 1/3207 62/89 |
| 2015/0122472 A1* | 5/2015 | Higuchi | B60H 1/00849 165/202 |
| 2015/0380785 A1* | 12/2015 | Takeuchi | H01M 10/663 429/62 |
| 2016/0025578 A1* | 1/2016 | Meirav | G01K 17/06 374/40 |
| 2016/0361973 A1* | 12/2016 | Mayer | B60H 1/00764 |
| 2017/0009677 A1* | 1/2017 | Brinkmann | F02D 41/0007 |
| 2017/0182861 A1* | 6/2017 | Steinman | B60H 1/00028 |
| 2017/0305230 A1* | 10/2017 | Sekito | B60H 1/00057 |
| 2017/0368940 A9* | 12/2017 | Miyakoshi | B60L 1/02 |
| 2018/0001734 A1* | 1/2018 | Faust | B60H 1/00064 |
| 2018/0134118 A1* | 5/2018 | Hintea | B60H 1/00971 |

\* cited by examiner

| $T_{amb}$ = 90 Deg F | RH = 90 % | Dew point 87 Deg F |

| Target = 90 Deg F | RH = 60 % | Dew point 60 Deg F |

For air exchanges per hour                  35 Lb/hr
Control evap. temp. to not less than      60 Deg F

| | | |
|---|---|---|
| For 90 Deg F air | Water content per Lb dry air | 0.0272 Lb/Lb |
| For 75 Deg F air | Water content per Lb dry air | 0.0113 Lb/Lb |
| | Difference | 0.0113 Lb/Lb |
| Latent heat | 972 BTU/Lb | 541 BTU/hr |
| Sensible heat | | 127 BTU/hr |
| Total | | 127 BTU/hr |
| Add occupant | 100W    Estimate | 341 BTU/hr |
| Add sun load, leakage | 2000W    Estimate | 6810 BTU/hr |
| | Total A/C load | 7819 BTU/hr |

FIG. 11

| $T_{amb}$ = 85 Deg F | RH = 25 % | Dew point 45 Deg F |

Target = 75 Deg F    RH = n/a    Dew point n/a

For air exchanges per hour          35 Lb/hr
Control evap. temp. to not less than    60 Deg F For 85 Deg F air    Water content per Lb dry air    0.0063 Lb/Lb
Add water vapor contribution from occupant    0.0024 Lb/Lb
                Total    0.0087 Lb/Lb Cool to 75 Deg F    Sensible heat    85 BTU/hr Add occupant          100W    Estimate    341 BTU/hr
Add sun load, leakage    1000W    Estimate    3410 BTU/hr
                Total A/C load    3836 BTU/hr

FIG. 12

| $T_{amb}$ = 70 Deg F | RH = 80 % | Dew point 64 Deg F |
|---|---|---|

| Target = 75 Deg F | RH = 60% | Dew point 60 Deg F |
|---|---|---|

| For air exchanges per hour | | 35 Lb/hr |
|---|---|---|
| Control evap. temp. to not less than | | 60 Deg F |
| For 70 Deg F air | Water content per Lb dry air | 0.0126 Lb/Lb |
| For 75 Deg F air | Water content per Lb dry air | 0.0113 Lb/Lb |
| | Difference | 0.0013 Lb/Lb |
| Latent heat | 972 BTU/Lb | 44 BTU/hr |
| Sensible heat | | -42 BTU/hr |
| Total | | 2 BTU/hr |
| Add occupant | 100W    Estimate | 341 BTU/hr |
| Add sun load, leakage | 0        Estimate | 0 BTU/hr |
| | Total A/C load | 343 BTU/hr |

FIG. 13

Cab interior air at 90 Deg F with 90% RH

Latent heat for cab interior air -

| | |
|---|---:|
| Moisture content of cab interior air | 0.0272 Lb/Lb |
| Moisture content of target cab interior air | 0.0108 Lb/Lb |
| Difference | 0.0164 Lb/Lb |
| Four air exchanges per hour | 35 Lb/hr |
| Condenser temperature | 60 Deg F |
| Resulting latent heat | 313 BTU/hr |
| Add sensible heat difference | 127 BTU/hr |
| Add sun load and leakage | 2000 BTU/hr |
| Total | 2440 BTU/hr |
| Improvement compared to example (1) | 69% |
| Improvement compared to example (3) | 36% |

FIG. 14

VEHICLE CLIMATE CONTROL SYSTEM

PRIORITY CLAIM

This application claims priority of Provisional Patent Application No. 62/216,210 filed on Sep. 9, 2015, the entire content of which is incorporated herein by reference.

FIELD

This disclosure relates to automotive vehicles, meaning any self-propelled on-road or off-road vehicle, such as a commercial truck for example, and in particular it relates to a climate control system for an automotive vehicle.

BACKGROUND

The climate control system for the interior of many currently manufactured automotive vehicles comprises both a heater and an air conditioner. In an automotive vehicle having such a climate control system, both heater and air conditioner rely on a prime mover, such as an internal combustion engine, which propels the vehicle in order to provide heating and cooling of the vehicle's interior.

In an automotive vehicle which is propelled by an internal combustion engine, heating of the interior is provided by heat from engine coolant flowing through a heater core. A blower fan draws air through the heater core and forces heated air into the interior through a distribution system. Heating is controlled in any of various existing ways, either manually or automatically.

Manual control is by occupant adjustment of a temperature input device having a knob or lever for selecting temperature. If occupant-desired temperature is not maintained, the occupant must manually re-adjust the input device.

Automatic control of heating is accomplished by a controller using temperature feedback to modulate heating provided by the heater core for maintaining a desired temperature set by an occupant on a temperature selection device.

Cooling of the interior is provided by liquid refrigerant which evaporates as it passes through an evaporator in a refrigeration circuit having a mechanically operated compressor coupled through a clutch to the engine. With the engine running and the clutch engaged, the compressor draws vaporized refrigerant from the evaporator and pumps it through a condenser where heat of evaporation in the refrigerant is rejected to outside air causing the refrigerant to condense into liquid which is then pumped back through an expansion valve to the evaporator.

Because the compressor is being driven by the engine, the amount of cooling provided by the evaporator depends on engine speed. The compressor is sized and operated to deliver an amount of cooling which is considered sufficient for reasonable occupant comfort when the vehicle is stopped and the engine is running at idle speed. However, that significantly reduces overall compressor efficiency because when the vehicle is being propelled by the engine, the engine is operating the compressor at speeds which are significantly greater than speeds which provide best compressor operating efficiency. A typical Coefficient of Performance (COP) for automotive air conditioning systems is somewhere around 1.5. (COP is the ratio of cooling-delivered energy BTUs to input energy BTUs).

In certain commercial vehicles, an engine cooling fan is coupled through a clutch for operation by the engine to draw air through the condenser when the compressor is operating and internal refrigerant pressure exceeds a predetermined limit. At low vehicle speeds, cooling fan operation may create additional noise, as well as drawing dust and dirt through the condenser. Engine cooling fan operation contributes to inefficient air conditioning operation because typical fan operation uses significantly more power (perhaps as much as fifty or more horsepower) than that required to draw air through the condenser (typically less than one horsepower).

A thermostatic control is commonly used to control temperature when the interior is being cooled. When the temperature becomes greater than a selected temperature to which the thermostatic control is set, the compressor operates to cool air which is drawn by a blower fan across heat exchange surfaces of the evaporator and subsequently moved into the occupant compartment. When temperature becomes less than the selected temperature set by the thermostatic control, operation of the compressor is discontinued. A hysteresis margin of a few degrees may be provided between "compressor-on" and "compressor-off" to reduce the frequency of cycling the compressor back and forth between on and off. For the typical vehicle air conditioning system, the evaporator is operated in the 35°-45° F. (Fahrenheit) temperature range. An air mixing valve controls the ratio of air sourced from the evaporator with air sourced from the engine coolant heater core (heat exchanger) to achieve the selected temperature, with the driver adjusting recirculation fan speeds for comfort. It is noted that with the evaporator operating in the 35°-45° F. temperature range, the system is very effective for reducing relative humidity within the vehicle interior, even in a low relative humidity ambient environment.

A temperature sensor located at the condenser functions to disengage the compressor clutch if the sensed temperature is too low, thus avoiding build-up of ice on the condenser surfaces. Consequently, the compressor may cycle off and on as the system operates.

During cold weather operation, hot air from the heater core is mixed with cold air from the evaporator to produce warm and dry air for the defog/defrost function. Other mixing valves provide functions such as heating only, and venting with outside air.

In summary, the typical vehicle air conditioning system loses efficiency due to high compressor speeds, to the use of the engine coolant fan for condenser air flow, to the mixing of heated air from the heater core with cold air delivered from the evaporator, and to operation of the evaporator in the 35°-45° F. temperature range.

SUMMARY OF THE DISCLOSURE

This disclosure introduces a climate control system for the interior, sometimes referred to as the cabin or occupant compartment, of an automotive vehicle in which both interior temperature and interior relative humidity are controlled by a system controller to maintain temperature and relative humidity of interior air within a comfort zone. Maintaining control within a comfort zone enables significantly improved efficiency at the system component level, resulting in reduction of basic fuel consumption as needed for vehicle HVAC (heating, ventilating, air conditioning) systems as well as enabling vehicle interior comfort without operation of the vehicle engine (idle reduction). Control is provided by at least one algorithm, look-up table, or the like which define correlations of air temperature and relative humidity which are considered to provide a generally acceptable comfort zone for most people. The correlations are empirically derived and/or mathematically calculated.

Measurements of temperature and relative humidity of occupant compartment air are provided by respective sensors and are evaluated by the system controller. When evaluation discloses that the condition of occupant compartment air lies outside the comfort zone, the system controller causes the climate control system to take corrective action. Temperature and relative humidity can be controlled in various ways, but changing one of the two variables typically changes the other. Heating of air which is to be introduced into the occupant compartment affects the air's relative humidity, as does cooling of air which is to be introduced into the occupant compartment.

For many years, two-speed compressors have been used in light commercial vehicle air conditioning systems to improve efficiency. An embodiment of this disclosure uses a high efficiency, variable speed compressor for coordinated control of relative humidity and temperature control to maintain occupant compartment air within a user comfort zone. It is noted that while control of either a single-speed or a two-speed compressor may alternately be achieved by cycling the compressor on and off, a variable speed (capacity) system will achieve better efficiency (i.e. in the 10-15% range) due to the ability to operate the compressor with best efficiency for the needed cooling capacity.

For example, a refrigerant compressor can be operated to increase cooling of humid, high temperature air passing over heat exchange surfaces of an evaporator and thereby decrease both temperature and relative humidity of air in the vehicle's interior. Once temperature and relative humidity of interior air have been restored to the comfort zone (which may be attributable to the relative humidity being reduced, the temperature being reduced, or a combination of both), the system controller reduces the speed (i.e., capacity) of a variable speed compressor to balance interior BTU heat gain (due to ambient temperature and compartment insulation, radiated heat, etc.) against BTU removal via the evaporator.

By taking not only temperature but also relative humidity into account in a control strategy, the compressor may be operated at a lower power level than if only a low evaporator temperature is used with the mixing of heated air from the heater core to achieve desired air temperatures:

Removal of humidity in occupant compartment air to achieve operation within a temperature/relative humidity comfort zone is more effective (in terms of occupant sensitivity) than removal of heat based solely on temperature.

When the ratio of latent heat to sensible heat is considered at higher temperature/relative humidity levels, it is seen that targeting the removal of latent heat results in significantly better cooling than targeting removal of sensible heat. (Sensible heat removal is removal of BTUs from dry air, while latent heat removal is removal of BTUs from air having water vapor).

A system that operates with airflow obtained from a very low evaporator temperature slightly above 32° F. where the cold air is mixed with warm air obtained from a heater core is inherently inefficient, and depending upon operating conditions, may be significantly inefficient.

A system that employs a continuously variable compressor capacity enables better efficiency than a system where the compressor is cycled to obtain the target capacity via averaging.

A system that delivers conditioned air to a zone (such as driver seating zone or a sleeper zone) achieves comfort with less energy expenditure than a system that attempts to cool the entire cab and/or sleeper.

A system that provides driver-initiated remote control of interior temperature-relative humidity when the vehicle's engine is not operating can operate the vehicle climate control system for cooling and/or heating the interior using engine idling.

The use of high energy density battery packages for energy storage enables engine-off system operation. These battery packages also enable capture of waste energy from deceleration and braking as well as solar energy for operation of a climate control system.

A system that targets removal of moisture from inside air and avoids re-heating of evaporator sourced airflow will provide meaningful fuel savings for automotive vehicles, such as for a fleet of highway trucks.

The foregoing summary, accompanied by further detail of the disclosure, will be presented in the Detailed Description below with reference to the following drawings that are part of this disclosure.

BRIEF DESCRIPTION OF THE DRAWINGS

FIGS. 11, 12, 13, and 14 are examples of energy requirements for bringing initial occupant compartment temperature and relative humidity into the comfort zone.

DETAILED DESCRIPTION

Figure 1:
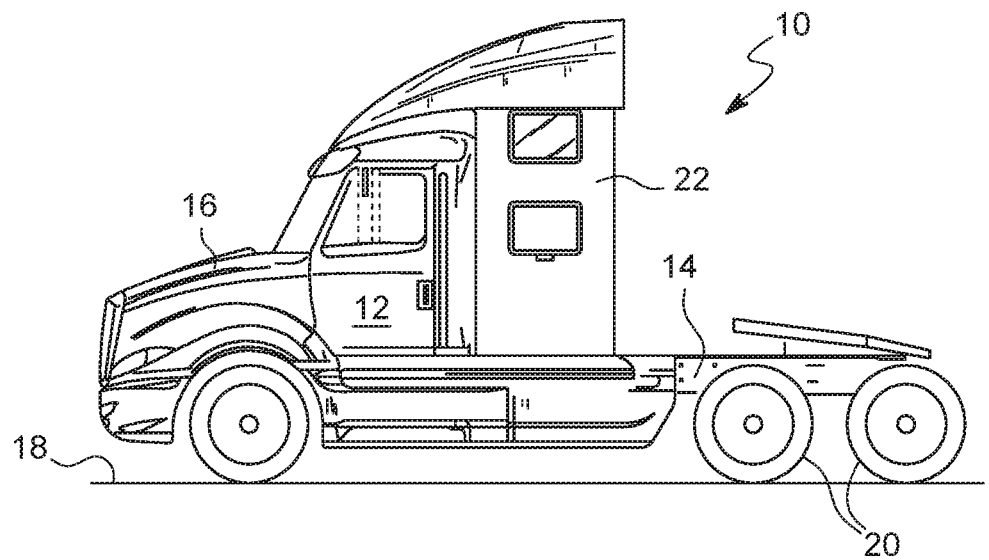
FIG. 1 is a side elevation view of an automotive vehicle which has a climate control system for its occupant compartment.

FIG. 1 shows a highway tractor 10 as an example of an automotive vehicle. Highway tractor 10 has a cab 12 mounted on a chassis frame 14. The interior of cab 12 comprises an occupant compartment a forward portion of which has a seat for a driver of highway tractor 10 and may also have a seat for a passenger. Forward of cab 12 is a hood 16 which covers an engine compartment containing a diesel engine (reference numeral 60 in FIG. 3) which forms part of a powertrain for propelling highway tractor 10 on an underlying land surface 18 via tandem rear axle drive wheels 20. A rear portion of the occupant compartment comprises a sleeper compartment 22 which provides sleeping accommodation for an occupant. Highway tractor 10 also has a climate control system (reference numeral 24 in FIG. 3) for conditioning inside air within the interior of cab 12 by control of both its temperature and its relative humidity as will be explained later with additional reference to FIG. 2.

Figure 3:
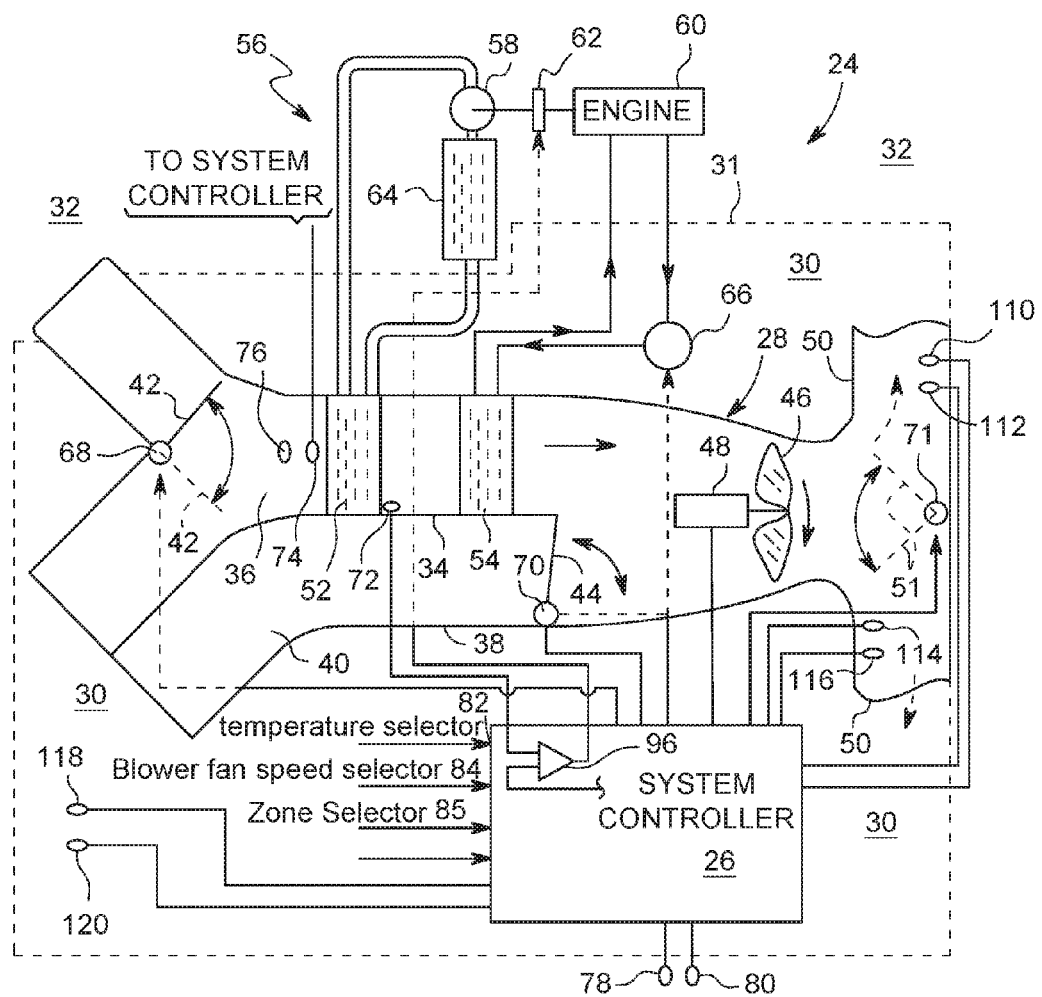
FIG. 3 is a schematic diagram showing one example of the climate control system in the automotive vehicle shown in FIG. 1.

Climate control system 24 is shown in FIG. 3 to comprise a system controller 26 and an air handler 28. Inside air (meaning air within the interior of cab 12) is represented by the reference numeral 30 within by the area bounded by the broken line polygon 31 while the unbounded area outside polygon 31 represents outside air 32 (meaning air in the environment outside cab 12).

Air handler 28 comprises a primary airway 34 having an entrance 36 through which air can enter and a secondary airway 38 having an entrance 40 through which air can enter.

A damper 42 controls the source of air which enters entrance 36 for passage through primary airway 34. One source is inside air 30 and the other source is outside air 32. Damper 42 is operable either to open a selected one of the two sources while concurrently closing the other, or to allow air from both sources to enter entrance 36 and blend as they move through primary airway 34. The solid line position of damper 42 closes entrance 36 to outside air 32 while fully opening entrance 36 to inside air 30. The broken line position fully opens entrance 36 to outside air 32 while closing entrance 36 to inside air 30. Between the solid line position and the broken line position, damper 42 allows air from both sources to enter entrance 36.

A damper 44 is operable to selectively restrict passage of inside air 30 through secondary airway 38. Damper 44 can completely restrict (solid line position) or not restrict (broken line position), the passage of inside air 30 through secondary airway 38. Between those extremes, damper 44 partially restricts secondary airway 38.

Either or both dampers 42, 44 may be automatically controlled by system controller 26 in an automatic mode of operation, or may be manually controlled by the driver in a manual mode of operation.

At a location downstream of both airways 34, 38 is a blower fan 46 operated by an electric motor 48. Blower fan 46 operates to draw air into entrance 36 and move that air through primary airway 34 and to draw any inside air 30 which damper 44 allows to be drawn into entrance 40 through secondary airway 38. Air from airways 34, 38 is introduced into the interior of cab 12 through an air distributor 50. Depending on how dampers 42 and 44 are operated, air entering air distributor 50 may be entirely recirculated inside air 30, entirely fresh outside air 32, or a blend of inside and outside air.

Air handler 28 and/or air distributor 50 may also contain flow directors for air mixing and/or directing air to different zones within the interior of cab 12, such as to a driver zone, and/or to a passenger zone, and/or to a sleeper compartment zone. Flow directors may be fixed or movable to vary direction of air flow. FIG. 3 shows a movable damper 51 for directing air to two different zones. Damper 51 can completely block flow of air to either zone while directing the entire flow to the other zone, and between the extremes shown by solid and broken line positions, will allow some flow to each zone. A zone may contain movable flow directors for directing flow toward either the upper or the lower body of a seated occupant.

Air which is drawn through primary airway 34 is constrained to flow across heat exchange surfaces of a first heat exchanger 52 and of a second heat exchanger 54. One heat exchanger, first heat exchanger 52 in this example, is a cooler which removes thermal energy from air moving through primary airway 34 while the other heat exchanger, second heat exchanger 54 in this example, is a heater which adds thermal energy to air moving through primary airway 34.

Cooler 52 is an evaporator in a refrigeration circuit 56 through which refrigerant circulates. As liquid refrigerant passes through cooler 52, it evaporates by absorbing thermal energy from air moving across heat exchange surfaces of the evaporator. Refrigeration circuit 56 further comprises a compressor 58 operated by engine 60 through a clutch 62. With engine 60 running and clutch 62 engaged, compressor 58 operates to draw refrigerant coining from cooler 52 and pump it through a condenser 64 where heat of evaporation in the vaporized refrigerant is rejected to outside air 32 causing the refrigerant to condense back into liquid before being pumped to an expansion valve (not shown) through which refrigerant is delivered for ensuing passage through evaporator 52. Condenser 64 should be equipped with a temperature sensor that disengages clutch 62 to avoid operation which might result in ice accumulation on the condenser.

Heater 54 is a liquid-to-air heat exchanger through which engine coolant is pumped to heat air flowing through primary airway 34 via heat exchange surfaces of the heater. Engine coolant is pumped through engine 60 by a coolant pump, which may be driven by the engine or an electric motor, with some coolant being shunted to an inlet of a heater control valve 66 which, when open, allows coolant to flow to and through heater 54 and then return to engine 60 as suggested by the directional arrows. Heater control valve 66 is controlled by system controller 26 to be fully closed, fully open, or partially open within a range between fully closed and fully open. Controlling coolant flow through heater 54 controls the thermal energy added to air moving through primary airway 34.

System controller 26 controls operation of damper 42 via a motor 68, operation of damper 44 via a motor 70, operation of damper 51 via a motor 71, and speed of blower fan 46 via control of speed of motor 48. System controller 26 performs control functions based on inputs from one or more sensors including an evaporator temperature sensor 72, an inside air temperature sensor 74, an inside air relative humidity sensor 76, an outside air temperature sensor 78, an outside air relative humidity sensor 80, and from controls which are set by the driver, such as a temperature selector 82 for setting an interior temperature which the driver considers comfortable and a blower fan speed selector 84 for setting a desired velocity of air entering the occupant compartment interior. A zone selector 85 can select a particular zone or zones within the occupant compartment into which conditioned air is introduced.

Sensors 74, 76 are placed in a location where air can be representative of air having temperature and humidity which would be sensed by an occupant. That location should not be exposed to direct or reflected sunlight. FIG. 3 shows one example where sensors 74, 76 are placed at entrance 36 of primary airway 34 which allows them to sense temperature and relative humidity of inside air 30 when damper 42 is fully closing primary airway 34 to outside air 32. Other possible placements will be mentioned later.

Climate control system 24 operates to control both temperature and relative humidity of inside air 30 for creating and maintaining an environment within the cab interior which is considered comfortable to most occupants.

Figure 2:
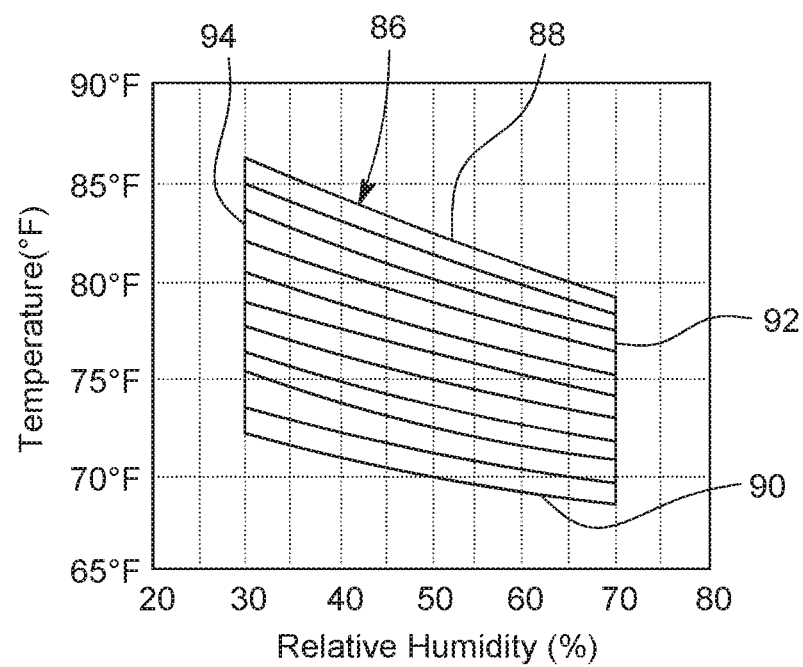
FIG. 2 is a diagram showing an example of a temperature/relative humidity comfort zone for the climate control system in the automotive vehicle shown in FIG. 1.

The control uses one or more algorithms, look-up tables, or the like which define correlations of air temperature and relative humidity which are considered to provide comfort for most occupants. The correlations are empirically derived and/or mathematically calculated. FIG. 2 is an example of how a comfort zone 86 is defined as a function of temperature and relative humidity.

With damper 42 closing primary airway 34 to outside air 32, temperature and relative humidity of inside air 30 as measured by sensors 74, 76 are evaluated by system controller 26 with respect to comfort zone 86. When evaluation discloses that the condition of inside air 30, as measured by its temperature and its relative humidity, lies outside temperature boundaries 88, 90 and/or relative humidity boundaries 92, 94 of comfort zone 86, then climate control system 24 takes corrective action to bring temperature and relative humidity within comfort zone 86.

Climate control system 24 operates to create and maintain conditioned inside air 30 having temperature and relative humidity within comfort zone 86 by setting a target temperature within comfort zone 86 and/or a target relative humidity within comfort zone 86. For reducing temperature and/or relative humidity within one or more zones of the occupant compartment, initial operation of climate control system 24 causes compressor 58 to begin operating, damper 44 to fully close and block flow through secondary airway 38, and damper 42 to allow only inside air 30 to enter primary airway 34 while blocking outside air 32. Blower fan 46 operates at a speed which creates suitably high air movement through primary airway 34.

When sensors 74, 76 disclose that one of the targets has been reached, system controller 26 determines if the value of the parameter whose target has not been reached, is within comfort zone 86. If it is, damper 44 is opened to allow inside air to also flow through secondary airway 38 and mix with the flow through primary airway 34. Operation of compressor 58 may be discontinued and speed of blower fan 46 reduced.

As long as sensors 74, 76 continue to disclose temperature and relative humidity values within a defined area of comfort zone 86, compressor 58 does not necessarily have to operate. However when sensors 74, 76 disclose a temperature value or a relative humidity value outside that defined area of comfort zone 86, compressor 58 is restarted and damper 44 can be readjusted although not necessarily fully closed. Blower fan speed may or may not be readjusted.

Once temperature and relative humidity values have been restored to within the defined area of comfort zone 86, compressor 58 is stopped. Damper 44 and blower fan speed may be readjusted as appropriate.

Target temperature and target relative humidity may be programmed in system controller 26, subject to adjustment by an occupant of the cab, or they may be manually set by an occupant of the cab using temperature and relative humidity selector devices.

Operation of climate control system 24 is further explained by the following examples.

Example 1—Inside Air Initially has 90° F. Temperature and 90% Relative Humidity

When temperature/relative humidity are beyond either or both boundaries 88, 92 of comfort zone 86, compressor 58 operates to remove thermal energy from air moving across heat exchange surfaces of cooler 52 and thereby decrease both temperature and relative humidity of inside air 30. Inside air is conditioned most quickly if both damper 44 is closed to block flow through secondary airway 38 and damper 42 is positioned to allow inside air 30 to enter airway 34 for recirculation while blocking outside air 32 from entering. Temperature of heat exchange surfaces of cooler 52 is controlled to be slightly less than the dew point temperature of inside air 30 being recirculated through primary airway 34. The magnitude of the difference between temperature of heat exchange surfaces of cooler 52 and dew point temperature of inside air is controlled to be not greater than a defined temperature difference as the temperature of inside air is dropping.

Because damper 42 is allowing only inside air to enter primary airway 34, system controller 26 can calculate the dew point temperature of inside air 30 from temperature measured by temperature sensor 74 and relative humidity measured by relative humidity sensor 76. Even with a small temperature difference such as 1.0°-1.5° C. (Centigrade) for example, substantial moisture is being removed from the recirculating inside air as the air's temperature is dropping. Once temperature/relative humidity of inside air 30 has been restored within comfort zone 86 as explained above, system controller 26 can discontinue operation of compressor 58. It should be noted that the conditioning of inside air 30 which restores its temperature/relative humidity to comfort zone 86 may be attributable to the relative humidity being reduced, the temperature being reduced, or a combination of both.

Compressor 58 can intermittently operate in coordination with operation of dampers 42, 44 to maintain temperature/relative humidity of inside air 30 within comfort zone 86. Proper blending of flows through both airways 34 and 38 can achieve a target temperature/relative humidity within a desired area of comfort zone 86. It may be noted that if damper 42 is operated to open entrance 36 to outside air 32 while preventing inside air 30 from entering primary airway 34, sensors 74, 76 would measure temperature and relative humidity of outside air 32.

Control system 26 employs closed-loop control 96 of clutch 62 (FIG. 3). During cooling of air moving through primary airway 34, closed-loop control 96 keeps clutch 62 engaged until temperature/relative humidity of recirculated inside air 30 reaches a target area within comfort zone 86. As cooler 52 is cooling recirculated air, much of the water vapor in the air is removed so that the conditioned air delivered into the occupant compartment has generally less than approximately 20% relative humidity. The conditioned air passes into the occupant compartment to mix with less conditioned air thereby gradually moving temperature/relative humidity of inside air 30 toward a target area within comfort zone 86. Clutch 62 is disengaged when sensors 72, 74 disclose that temperature/relative humidity of inside air 30 is within the target area of comfort zone 86.

To maintain freshness, inside air 30 air should be exchanged several times per hour. If only inside air is being recirculated through air handler 28, air can be exchanged by operating damper 42 to open entrance 36 to outside air 32 and using an exhaust fan (not shown) to exhaust some inside air out of the occupant compartment. Damper 42 can be operated so that only fresh outside air 32 moves through primary airway 34. Depending on the condition of outside air 32, continued cooling of that air may enable temperature/relative humidity of inside air 30 to move into comfort zone 86 before inside air is once again recirculated.

For high temperature, high humidity outside air 32, the ratio of recirculated inside air 30 to fresh outside air 32 may be increased in comparison to what the ratio of recirculated inside air 30 to cooler or less humid outside air 32 would be. Sensors 78, 80 provide temperature and relative humidity measurements of outside air 32 to system controller 26 for use in conjunction with temperature and relative humidity measurements of inside air 32 from sensors 74, 76 to set the ratio of recirculated inside air 30 to fresh outside air 32.

Empirically derived look-up tables are stored in system controller 26 for use in calculating the ratio as a function of temperature and relative humidity of outside air 32 and temperature and relative humidity of inside air 30.

By taking into account not only temperature but also relative humidity of the air, compressor 58 may be operated less frequently than if air temperature alone is used, and that can achieve meaningful fuel savings for highway tractor 10.

Figure 6:
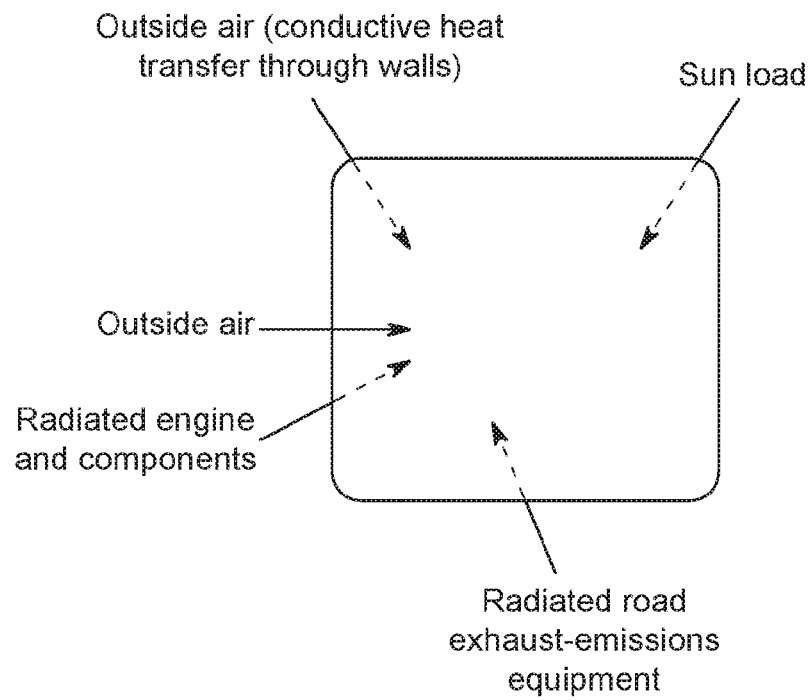
FIG. 6 is a diagram showing exothermic inputs to the occupant compartment.
Figure 7:
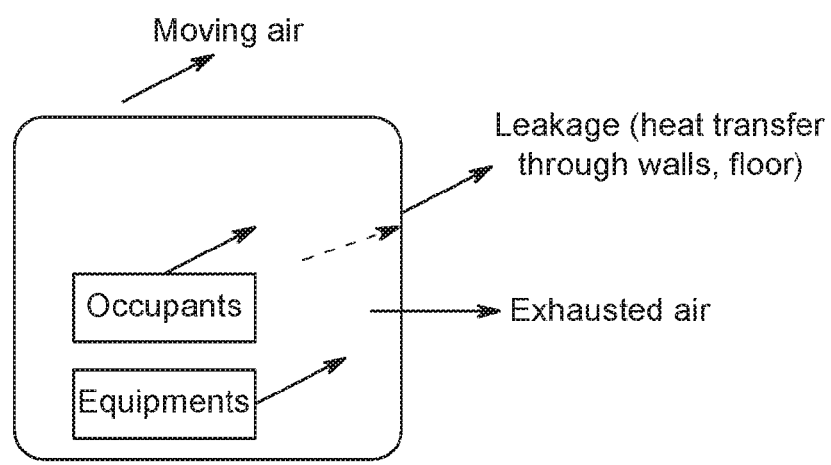
FIG. 7 is a diagram showing endothermic outputs from the occupant compartment.

FIG. 6 illustrates potential sources of external thermal energy input to the interior of cab 12. FIG. 7 illustrates sources within the cab interior (occupants and equipment) which contribute to thermal energy within the cab interior and how thermal energy within the cab interior can potentially be dissipated to the exterior. For any given set of interior and exterior conditions, not all factors will exist. For example when the exterior temperature is less than the interior temperature, the interior will lose heat to the exterior and not gain heat from the exterior.

FIG. 11 shows a calculation of the energy requirement (7819 BTUs/hour) for bringing the initial occupant compartment temperature and relative humidity to a target temperature 75° F. and a target relative humidity 60% within the comfort zone based on certain assumptions noted in the Figure.

Example 2—Inside Air Initially has 85° F. Temperature and 25% Relative Humidity

This condition often exists in portions of Arizona. The ratio of recirculated inside air 30 to fresh outside air 32 may be made smaller than in Example 1) because a smaller ratio may not have a significant effect on increasing relative humidity of inside air 30, and indeed may be desirable for better freshening (increased oxygen content) of inside air 30 breathed by the driver (and any other occupants) while maintaining occupant compartment temperature and relative humidity within comfort zone 86. Because cooler 52 is both removing moisture from, and also reducing the temperature of, air passing through it, the relative humidity of inside air 30 is also being reduced, and because less moisture needs to be removed from low relative humidity air, a temperature of reduced relative humidity air which needs to be reached in order for inside air 30 to enter comfort zone 86 can be higher than if outside air 32 had higher relative humidity. Therefore, rather than continuing to operate compressor 58 until the temperature of inside air 30 reaches 72° F. for example, as would happen when relative humidity of outside air 32 is ignored, compressor 58 may need to operate only until the temperature of inside air 30 reaches 75° F., which still maintains occupant comfort, but conserves energy in doing so. An occupant of the vehicle can make certain adjustments for his/her own comfort premises, and the controller may be endowed with a learning algorithm which learns occupant preferences so that occupant adjustment becomes unnecessary.

Because natural processes of the human body result in transfer of moisture to the surroundings, reducing the ratio of fresh outside air 32 to recirculated inside air 30 can also increase relative humidity of inside air 30. The ratio is adjusted using look-up tables as explained earlier.

FIG. 12 shows a calculation of the energy requirement (3,836 BTUs/hour) for bringing the initial occupant compartment temperature to a target temperature 75° within the comfort zone which, because of the initially low relative humidity, will inherently have relative humidity within the comfort zone.

Example 3—an Increase in Relative Humidity of Inside Air 30 May Occur as a Result of Evaporation of Snow or Rain Brought into Cab 12 Such as by Repeated Ingress/Egress of Occupants High relative humidity of inside air 30 can result in window fogging and discomfort to an occupant. To avoid that possibility, cold outside air 32, which has low moisture content even if its relative humidity may be high (70° F., 80% relative humidity in this Example), is drawn through airway 34 and heated by heater 54 to provide warmed conditioned air of relative humidity low enough for use in window defogging and/or occupant comfort. FIG. 13 shows a calculation of the energy requirement (343 BTUs/hour) for bringing the initial occupant compartment temperature and relative humidity to a target temperature 75° and relative humidity 60% within the comfort zone.

Figure 4:
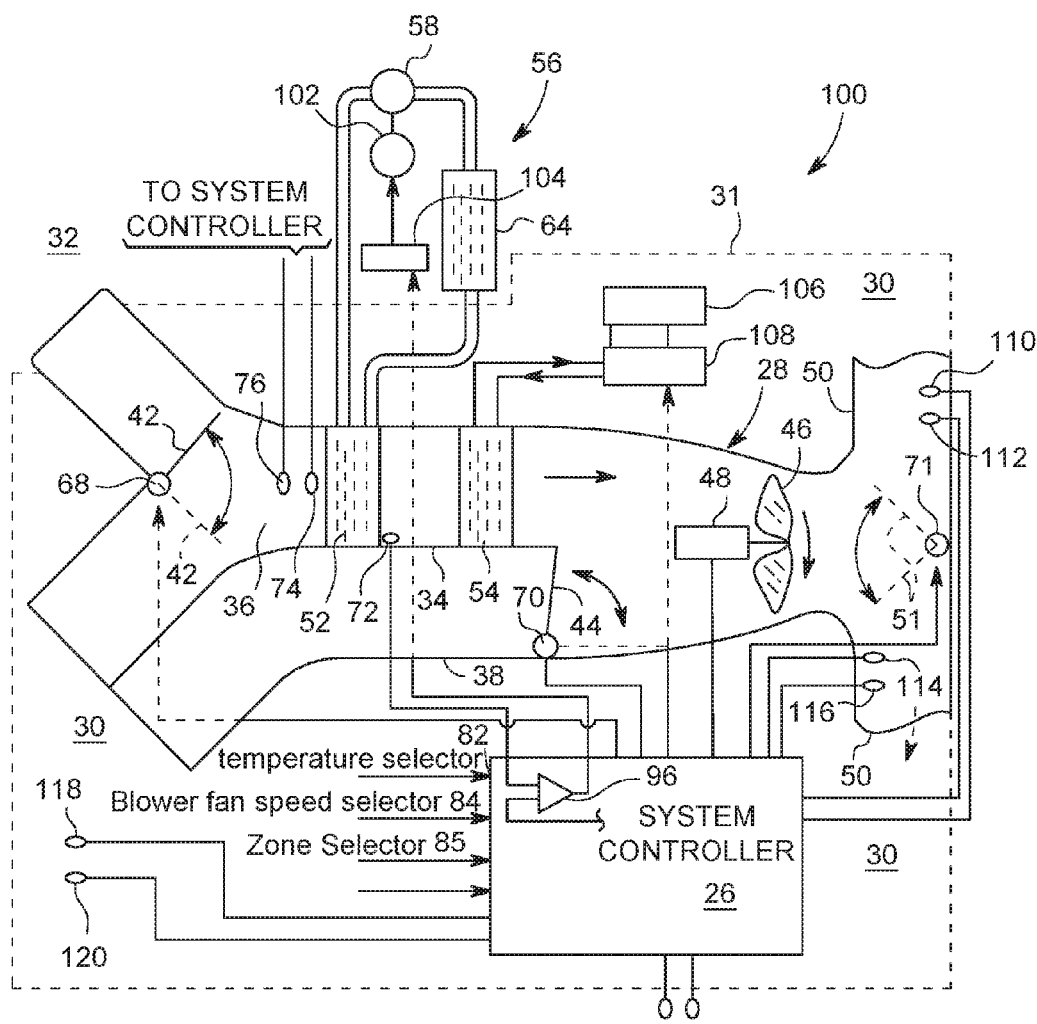
FIG. 4 is a schematic diagram showing another example of a climate control system in an automotive vehicle like the one shown in FIG. 1.

Another climate control system 100 is shown in FIG. 4. Components in FIG. 4 which are common to those already described in FIG. 3 are identified by the same reference numerals in both Figs. The component differences between the two climate control systems involve first and second heat exchangers 52, 54 and the equipment for operating them. System 100 can operate in the same way as described above for system 24.

Cooler 52 is still part of a refrigeration circuit 56, but instead of using engine 60 to operate compressor 58 through clutch 62, compressor 58 is operated by an electric motor 102 and associated motor controller 104 under control of system controller 26.

Second heat exchanger 54 is an electric heater which uses electricity from an electric power source 106, such as a rechargeable battery or battery bank in highway tractor 10 which can be recharged by an engine-operated electric generator or in other ways such as by electricity recovered during regenerative braking of highway tractor 10. Current drawn from power source 106 by heater 54 is regulated by a regulator 108 under control of system controller 26 to control heating of air flow through first airway 34.

Unlike climate control system 24, climate control system 100 operates without having to run engine 60. When highway tractor 10 is parked and sleeper compartment 22 is in use, engine 60 need not operate. Engine exhaust is not emitted, and a connection to shore power, if available, can operate the system without depleting on-board battery charge. Voltage and current monitoring is used for calculation of energy balance and battery state-of-charge with very low impedance batteries.

Placement of various components of system 100 is not necessarily restricted by under-hood location of the compressor and refrigerant lines. For example, in system 100, compressor 58 may be mounted on chassis frame 14 or on the exterior of cab 12 or sleeper compartment 22, and condenser 64 may also be mounted in those locations or in front of the engine coolant radiator.

Zone controlled heating may combine heat sourced from engine coolant with heat sourced from an electric heater in a system which has both a liquid-to-air heater and an electric heater. System controller 26 would sense temperature of engine coolant temperature, and if sufficient heat energy is unavailable, power would be applied to the electric heater to achieve the desired air temperature; however, if engine coolant temperature is sufficient, the electric heater would not need to operate.

When a vehicle has an engine-driven compressor, the driver may operate the engine in idle when the vehicle is stopped and outside temperature and relative humidity are high in order to maintain comfort. However, with electric HVAC systems having the comfort control algorithm, the system control may examine outside air temperature and humidity, and if within the comfort range, outside air may be used to offset sun loading within the cab with minimum energy required from a battery package. Manual remote controls or pre-programmed automatic controls may be used. For these applications, system 100 targets inside temperatures that are within comfort zone 86, resulting in minimal energy consumption for energy storage batteries. A second set of temperature and humidity combinations may be stored (or determined by algorithm) and used to control inside temperature during initiation of the HVAC system prior to the driver entering the vehicle. During initiation temperature and relative humidity may be outside comfort zone 86 but only by a relatively slight amount, so that after the driver enters the vehicle the normal operation of the HVAC system may rapidly bring the temperature and humidity combination within the comfort zone. The remote feature could also allow the driver to select climate control for the sleeping compartment or for the driver position. The communications link may also be used for driver information purposes such as vehicle readiness.

Because the system uses stored electrical power for operation, it is not allowed to deplete energy in the energy storage device or devices below power levels needed for starting the engine and/or running auxiliary devices. When it is sensed that the battery power is falling below a predetermined minimum level (which may or may not vary), the engine may be restarted automatically to further charge an energy storage device and then automatically shut off after sufficient charging. Alternatively, or additionally, as it is sensed that the battery level is below, or getting below, some predetermined level, then the compressor may be operated more intermittently (switched on and off), with the frequency of cycling the compressor on and off being varied in accordance with the decrease in stored energy. While it is also possible to vary the power level supplied to the compressor in accordance or proportional with the decrease in stored energy, cycling of the compressor on and off is advantageous in that a less complex compressor (and associated controls) may be utilized in a system in which the compressor is intermittently switched on and off as compared with a system in which the level of power to the compressor is varied. Also, the compressor in such a system may always be operated at the same, single, speed which provides optimum efficiency.

Operation of an all-electric system with energy storage may be initiated by remote or automatic control.

A USB to J1939 serial data bus converter will enable remote commands by a driver using a wireless device connection. Parameters of operation which the wireless device can set include one or more target zones within the occupant compartment, a target temperature within a zone, and a target relative humidity within a target zone. Other commands may include system starting time and an energy saving mode that brings cabin or zone temperature/relative humidity to a reasonable level (i.e., 85° F. with 40% relative humidity) prior to the driver entering the vehicle. The remote feature could also allow the driver to select climate control for the sleeper compartment or for the driver position. The communications link may also be used for driver information purposes such as vehicle readiness.

Automatic control may be used to reduce the effects of sun loading. Outside air and inside air temperatures are periodically monitored and compared. At a pre-specified differential temperature, outside air is brought into the cab interior via the low power fan used for outside air exchanges, and air within the vehicle may also be recirculated at a low power level; thus maintaining the cab interior at a temperature that is close to that of the outside air temperature. This feature requires energy usage monitoring to avoid battery depletion; however, if the vehicle is equipped with solar recovery, battery depletion is avoidable.

Visible indicators are optional and may include remaining time (hours) for energy storage capacity when operating with engine off, inside temperature near a seat or in the sleeper compartment, and system off-on time control for engine-off operation.

Besides sensors 74, 76, both FIGS. 3 and 4 show several additional temperature and humidity sensors. A temperature sensor 110 and a relative humidity sensor 112 are placed at an egress of air distributor 50 to one zone of the cab interior. A temperature sensor 114 and a relative humidity sensor 116 are placed at an egress of air distributor 50 to another zone of the cab interior. A temperature sensor 118 and a relative humidity sensor 120 are placed in the cab interior externally of airways 34, 38.

Automatic control may be enhanced through the use of proximity sensors for sensing whether or not the driver seat, the passenger seat, and/or the sleeper compartment are occupied. Conditioned air is delivered only to locations which are occupied.

An optimal vehicle air conditioning system should provide temperature, humidity, and cooling air velocity control. In addition, appropriately conditioned air may be directed to the head, shoulder, and arm areas for maximum skin area exposure. Manual override options may be provided, such as separate fan control. Electric heat with zone air flow control is capable of directing hot air to feet and legs as well as warm air to the head, arms, and torso areas, and zone control will improve efficiency as appropriate for minimizing the use of stored electrical energy since conditioned air is primarily provided to zone occupied by the vehicle operator. Outside air is brought into the cab of a vehicle for at least four purposes: (i) to avoid occupant discomfort due to carbon dioxide and moisture buildup resulting from the respiration of occupants. (ii) to enable driver and passenger comfort when outside air temperature and humidity is favorable, (iii) for removing heat generated by sun loading when the vehicle is not occupied, (iv) for defog/defrost operation as previously described.

Occupant comfort may be obtained without heating or cooling when outside air temperature and relative humidity are favorable. Damper 42 can be operated to provide either inside air or outside air or a mixture of the two. When cooling is needed, the control system automatically switches to recirculate inside air for best fuel economy.

For a typical start-up the occupant compartment air temperature may be very high. With direct sunlight on an 80° F. day, the interior air temperature may be 90° F. or more. Consequently, the system initially operates to bring the occupant compartment zone being cooled into the comfort zone by using a high fan speed (for example 80%) with damper 44 being closed and damper 42 allowing only inside air recirculation. That is the quickest way to achieve temperature/relative humidity within a desired target area of the comfort zone, after which fan speed is reduced to a low fan speed (for example 40%) and damper 44 is slowly opened to maintain the temperature/humidity within the desired area of the comfort zone.

If warm humid air is cooled, the energy expended may be considered to comprise sensible heat energy and latent heat energy. Sensible heat energy is the energy which would cool air having 0% relative humidity a selected number of degrees, and latent heat energy is the energy expended to remove moisture when cooling the air the selected number of degrees. Both may be expressed as BTU/Lb-Deg F.

At higher temperatures, air will hold more moisture. Consequently, latent heat energy of the air is higher. At 90° F., sensible heat energy is 21.7 and latent heat energy is 32.4, the ratio of the latter to the former being 1.49.

At 70° F., sensible heat energy is 16.9 and latent heat energy is 16.6, the ratio of the former to be latter being 1.02.

Depending upon how much moisture is removed from the air, an air conditioning system will expend a significant portion of its input energy to remove moisture. For example, at 90° F. 1.49 times more energy is needed to remove moisture than that needed to cool dry air.

However, when comfort is considered, a relatively small change in relative humidity can deliver a significant improvement in comfort. For example, a truck cab having 35 cubic feet air volume at 80° F. and 70% relative humidity (too damp) with three air exchanges per hour will require 119 BTU per hour to bring the humidity to 55% at 80° F. (comfortable). Decreasing the air temperature to 70° F. will also bring the air to a comfortable level, but will require 210 BTU per hour. Removing moisture is much more energy efficient at higher air temperatures.

For example at 90° F., the dew point temperature of 90% relative humidity air is 86.7° F., and at 80% relative humidity the dew point temperature is 83.0° F. At 70° F., the dew point temperature is 66.9° F. for 90% relative humidity air and is 63.6° F. for 80% relative humidity air Ideal targets for summer operation may be 76° F. air having 50% relative humidity, and for winter operation 72° F. air having 50% relative humidity.

For summer operation, the system operates to remove humidity, while for winter operation the system operates to increase temperature (which reduces humidity).

For summer operation at lower air temperatures; for example, 78° F. with 80% relative humidity, removal of humidity may result in an uncomfortable temperature. Consequently, mixing of recirculated air is appropriate when the humidity target is close to being achieved.

For winter operation; heat is added and when the target temperature is approached, it may become necessary to remove humidity to achieve comfort.

Two additional notes: (1) Blower fan speed should be set to achieve an appropriate airflow rate for comfort with the targeted humidity and temperature. (2) Window defogging operation is a function of the occupant compartment air vs. window glass temperature, and should be accomplished with high temperature air.

Figure 5:
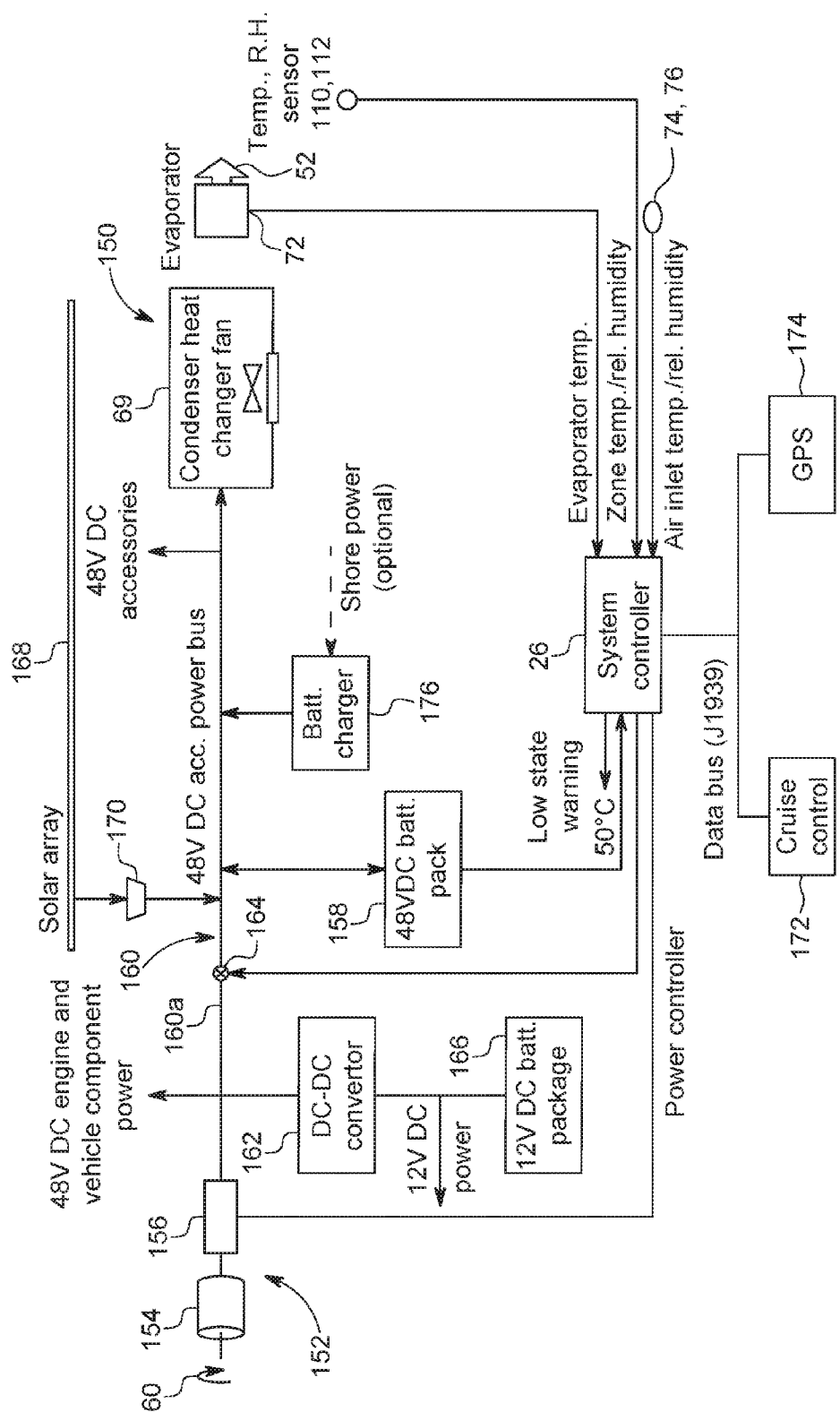
FIG. 5 is a schematic diagram showing a portion of another climate control system in association with a high-voltage energy recovery and storage system which provides electricity for operating the climate control system.

FIG. 5 shows a portion of an all-electric climate control system 150, certain components of which operate on electricity from a high-voltage energy recovery and storage system 152 which is additional to a low-voltage system, such as the one which operates climate control system 100. The only components of system 100 shown in FIG. 5 are system controller 26, some temperature/relative humidity sensors 72, 76, 110, 112, and condenser 64 and evaporator 52 of refrigeration circuit 56. It is understood that the remainder of system 150 is like that of system 100.

In certain driving situations, such as when vehicle 10 is decelerating, kinetic energy of the moving vehicle is available for recovery, storage and reuse. Energy not recovered is otherwise wasted, typically as heat. If a tractor and/or a trailer has a roof-mounted solar array, solar energy which would otherwise be incident directly on the roof can be captured and used to generate electricity. Energy available from such sources may at times exceed the power demand of a vehicle's electrical system, including its climate control system. Because the quantity of that energy and its frequency of occurrence are typically highly variable, the energy is stored and averaged with energy already in an energy storage device which ideally has very low electrical impedance (such as lithium or nickel-zinc batteries) to enable very efficient charging and charge acceptance.

Energy recovery and storage system 152 has an operating voltage (48 VDC for example) which is higher than that of the low-voltage systems typically present in most automotive vehicles where an engine-driven alternator keeps a battery, or battery bank, charged to 12 VDC via a 14 VDC power bus to provide appropriate power levels for climate control system operation as well as for engine cranking and coolant fan operation and for operation of various accessories such as lighting.

System 152 comprises a motor-generator 154, a power controller 156, a high-voltage energy storage device 158, such as a 48 VDC battery pack, a high-voltage power bus 160, and a DC-DC converter 162. A contactor 164 separates a first section 160A of power bus 160 from a second section 160B.

Motor-generator 154 is coupled with engine 60 in any suitably appropriate way. Power controller 156 is under supervision of system controller 26 which controls whether motor-generator 154 operates as a motor or as a generator or is idle. System controller 26 also has supervisory authority over contactor 164.

When engine 60 is running, motor-generator 154 is operating as a generator, and contactor 164 is not closed. Motor-generator 154 is being mechanically driven by engine 60 to deliver 48 VDC electricity via power bus section 160A to various 48 VDC Engine and Vehicle Components and for charging a 12 VDC battery package 166 via converter 162 if that battery package needs charging. If contactor 164 is also closed, motor-generator 154 can also deliver electricity via power bus section 160B to 48 VDC accessories including climate control system 150 and energy storage device 158.

When energy storage device 158 is sufficiently charged to satisfy demand of 48 VDC accessories served by power bus section 160B, an excess of stored energy can be delivered to either or both engine 60 and 48 VDC Engine and Vehicle Components served by power bus section 160A. By closing contactor 164 and operating motor-generator 154 as a motor, not only is electricity from energy storage device 158 delivered to 48 VDC Engine and Vehicle Components but also to motor-generator 154 which system controller 26 causes to operate as a motor delivering torque to engine 60. That torque is additive to torque being produced by combustion of fuel in engine 60 and consequently is helpful in various driving situations such as when a vehicle is climbing an uphill grade.

Vehicle 10 has a roof-mounted solar array 168 for capturing solar energy which would otherwise be incident directly on the vehicle roof. A charge controller 170 controls delivery of electrical charge generated by solar array 168 to section 160B of high-voltage power bus 160.

As mentioned earlier, system controller 26 contains look-up tables, algorithms, etc. for determining various data such as dew point and also monitors state-of-charge (SOC) of energy storage device 158 to determine if energy which would otherwise be wasted is available for conversion to electrical charge which can be stored in energy storage device 158.

In addition to previously mentioned driving situations suitable for waste energy recovery, a vehicle which is equipped with cruise control provides another opportunity for waste energy recovery.

Cruise control is essentially a closed-loop control system for maintaining a vehicle speed set by the driver. Changes in geography of a road on which a vehicle is traveling (road grade in particular) and environmental factors like headwinds and tailwinds create variance of a vehicle's actual speed from a cruise-control set speed. That variance becomes an error signal which the cruise control uses to restore set speed.

If the error signal is positive (vehicle speed greater than the cruise-control set speed), the cruise control operates to decelerate the vehicle and restore the set speed. Energy is therefore available for storage as charge in charge storage device 158, and so motor-generator 154 operates as a generator and contactor 164 is closed to capture what would otherwise be waste energy. If the error signal is negative, contactor 164 is not closed. The cruise control error provided from cruise control system 172 to system controller 26 via a J1939 data bus may be typified as "short duration" information because small occasional drivetrain power variations during cruise control operation don't last long when a vehicle is travelling in cruise control mode on relatively level road surfaces.

Similarly, motor-generator 154 operates as a generator and contactor 164 is closed in a regenerative braking mode of operation when a driver applies a vehicle's brakes.

Equipping a vehicle with a GPS system provides still another opportunity for waste energy recovery.

GPS geo-positioning information is used to anticipate stretches of a road suitable for capturing what would otherwise be waste energy when a vehicle is expected to travel on such stretches. For example, geo-mapping information from a GPS system 174 (also on the J1939 data bus) may be used to identify the average grade of a road over a specified distance prior to the vehicle arriving at the beginning of the grade. If the grade is downhill, as ascertained from GPS information indicating a negative change in elevation, energy from energy storage device 158 is delivered through contactor 164 in advance of the vehicle arriving at the beginning of the grade and is stored in 12 VDC battery package 166 and/or used to operate motor-generator 154 as a motor and deliver torque to engine 60. This "dumping" of stored charge is done to prepare the energy storage system 158 for maximum charge acceptance of energy recovered when the vehicle travels along the grade. SOC of system 158 is compared against the calculated duration of travel on the downhill grade, and is used to determine the charging rate for returning system 158 to full SOC at the completion of travel on the downhill grade. GPS geo-positioning information, unlike cruise control error, provides what may be typified as "long duration" information because GPS elevation information is typically averaged over longer durations.

Conversely, if an uphill grade is anticipated, anticipated vehicle electrical energy demand during travel on the uphill grade is calculated and compared with SOC of energy storage system 158 to determine if system 158 has excess energy which would be available to supplement engine power during travel along the uphill grade. If so, motor-generator 154 is operated as a motor and contactor 164 is closed when the vehicle enters the grade. Energy available from energy storage system 158 is allocated for most efficient delivery to supplement engine power during travel along the grade.

Should available energy be used up before the vehicle reaches the end of the grade, contactor 164 is promptly opened to terminate operation of motor-generator 154. Storage device 158 remains on-line for serving 48 VDC accessories on the 48 VDC portion of power bus 160 until travel on the grade ends. If SOC of storage device 158 becomes too low before travel on the grade ends, motor-generator 154 operates in the generator mode and contactor 164 is closed. When the vehicle is stopped, the engine is shut off, and an opportunity to connect to A/C "shore power" exists, an AC-DC converter 176 can be connected to shore power to charge storage device 158.

Figure 8:
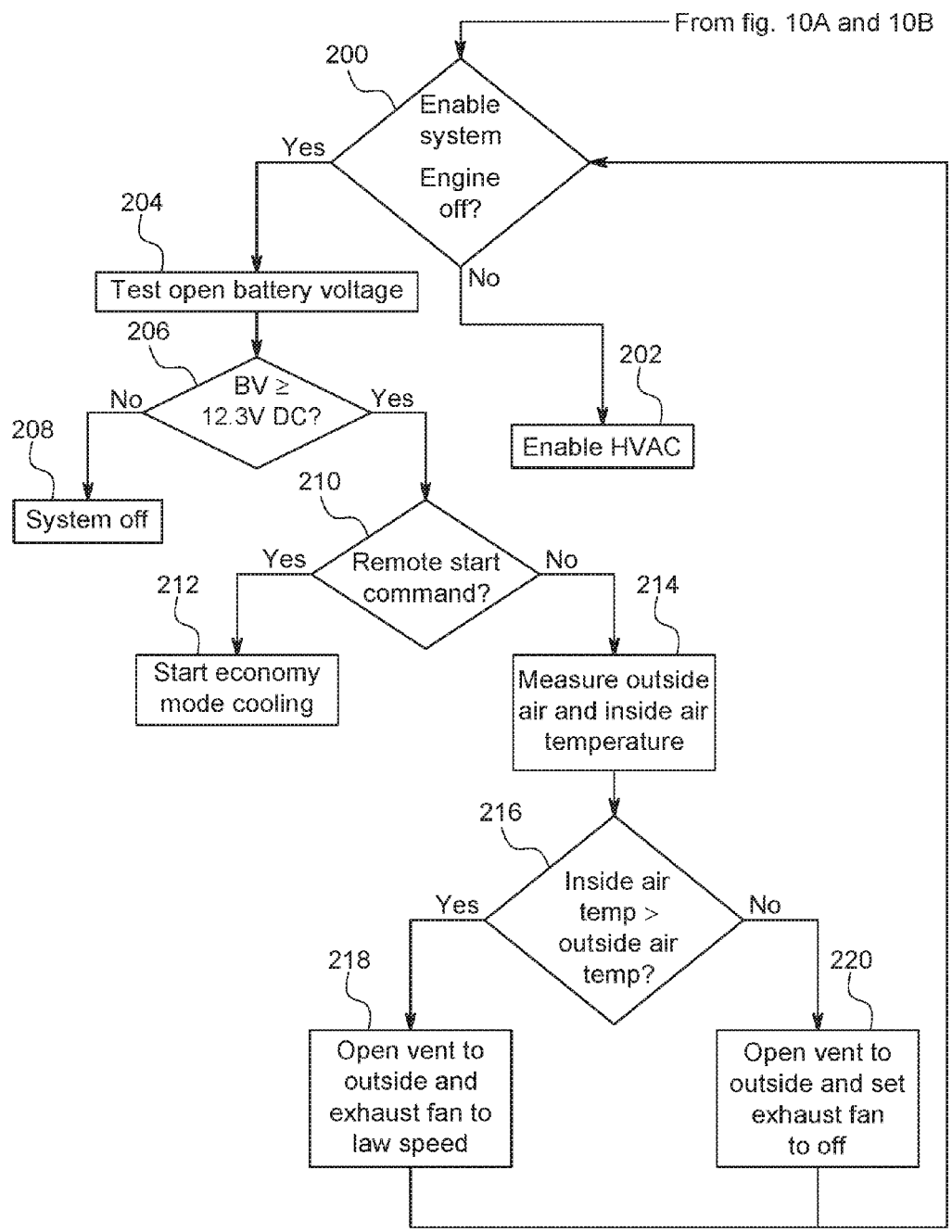
FIGS. 8, 9, and 10 are flow diagrams which collectively illustrate an example of a comprehensive strategy for attaining occupant compartment temperature and relative humidity within the comfort zone.
Figure 9:
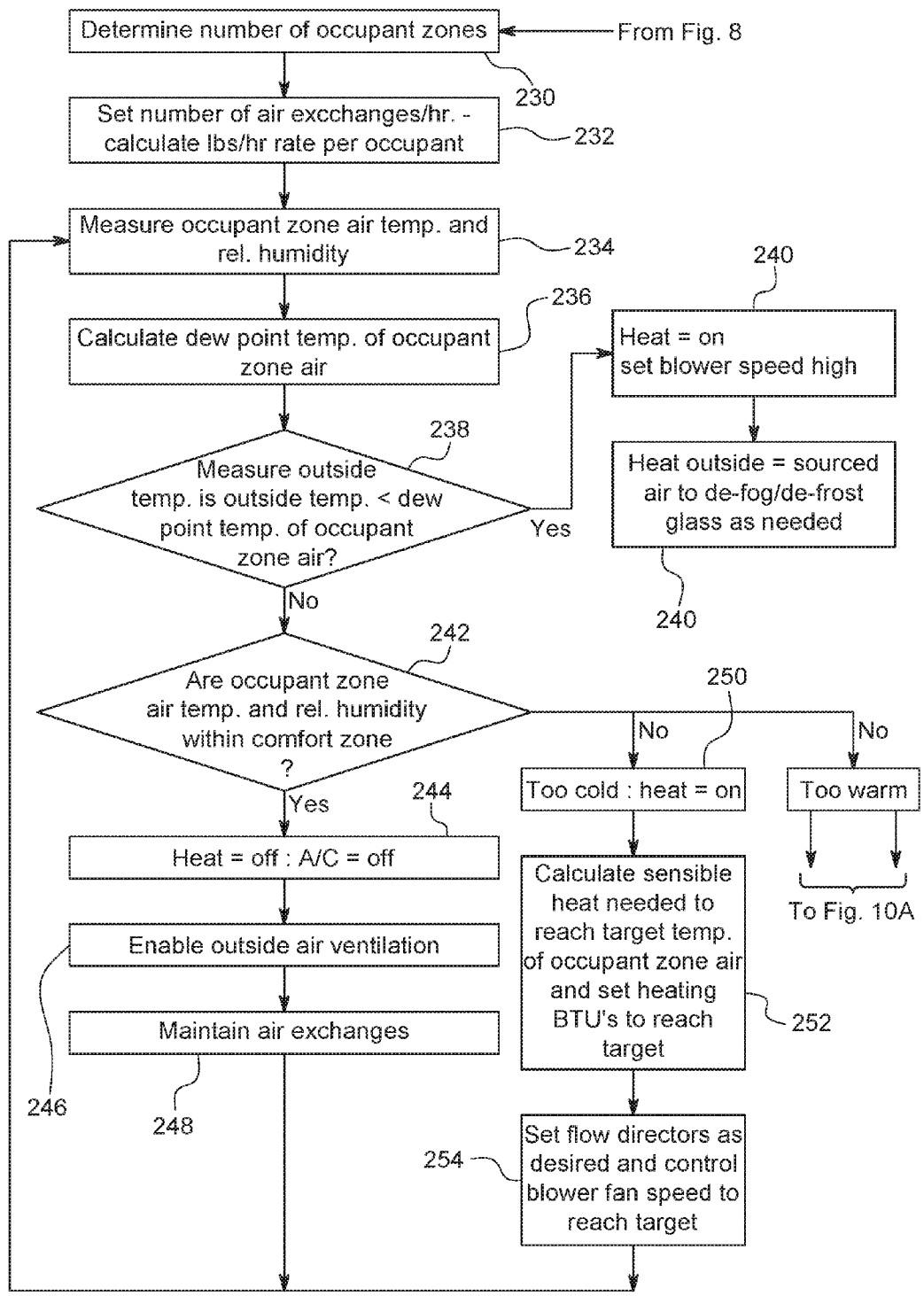
Figure 10A:
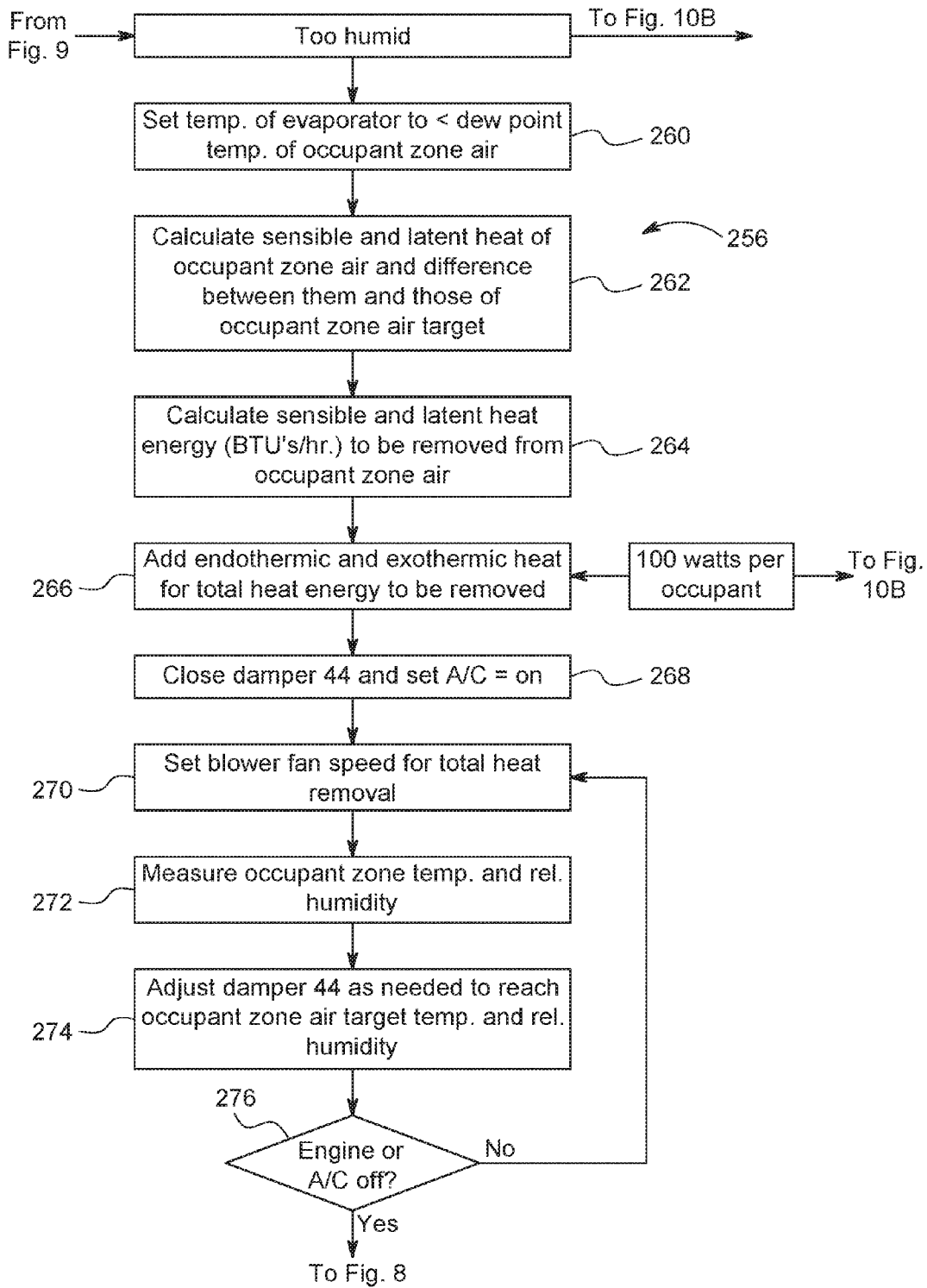
Figure 10B:
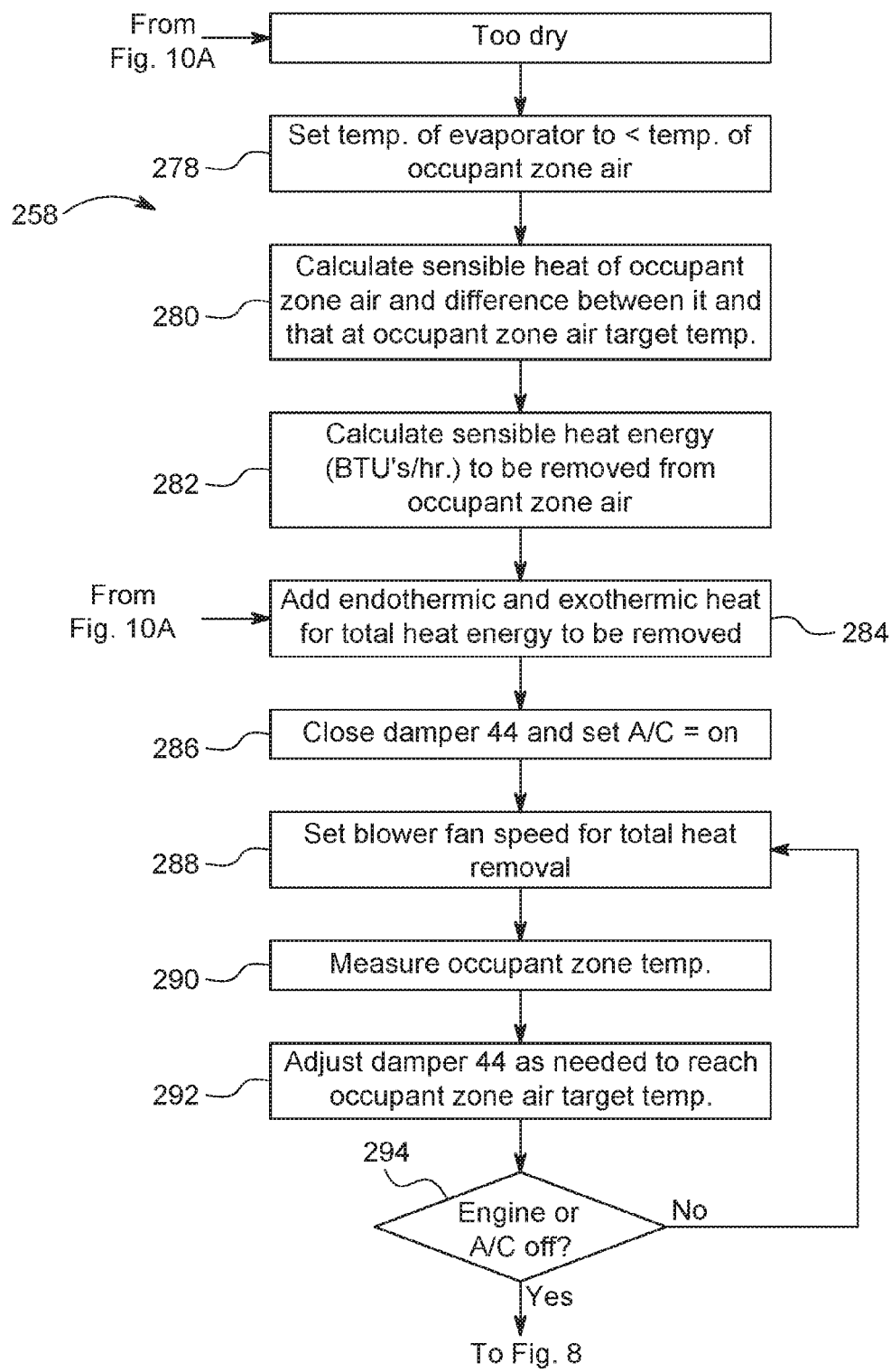

A description of a comprehensive control strategy is shown in FIGS. 8, 9, and 10 and begins with a step 200 in FIG. 8 which determines if engine 60 is or is not running. If engine 60 is not off (i.e. is running), a step 202 causes the portion of the strategy shown in FIG. 9 to be followed. If engine 60 is off (i.e. is not running), a step 204 tests battery voltage to determine if sufficient battery energy is available to operate the climate control system. If a step 206 determines that sufficient battery energy is not available, the climate control system remains off (reference numeral 208).

If sufficient battery energy is available, the cooling (A/C) portion of the climate control system may be turned on by a start cooling command (step 210) which can be given remotely from a wireless remote control outside the vehicle or by a hard-wired on-board control to initiate an economy mode of cooling. Assuming that occupant compartment temperature and/or relative humidity is/are beyond upper temperature and/or relative humidity boundaries of the comfort zone, compressor 58 begins to operate according to the economy mode (step 212) to commence occupant compartment cooling which will bring temperature/relative humidity of inside air to a boundary of the comfort zone rather than to a target within the comfort zone which would require more energy to achieve. FIG. 14 shows a calculation of the energy requirement (2440 BTUs/hour) for bringing the initial occupant compartment temperature and relative humidity to a boundary of the comfort zone based on assumptions noted in the Figure. The economy mode provides the improvements noted.

If sufficient battery energy is available and a ventilation command for ventilating the occupant compartment without operating the compressor is given, temperature of inside air and temperature of outside air are measured (step 214) and temperature of inside air is compared with temperature of outside air (step 216). If temperature of inside air is greater than temperature of outside air, a vent door through which inside air can be exhausted to the exterior is opened and the occupant compartment exhaust fan operates at low speed to exhaust air from the occupant compartment (step 218). If temperature of inside air is not greater than temperature of outside air, only the vent door through which inside air is exhausted to the exterior is opened and the occupant compartment exhaust fan does not operate (step 220).

When step 200 causes the portion of the strategy shown in FIG. 9 to be followed, certain measurements and calculations which were explained earlier (steps 230, 232, 234, 236 and 238) are performed. The measurements and calculations may be based on selected one or more occupant zones of the occupant compartment or on the entire occupant compartment. If the calculated dew point of occupant compartment air in an interior space which includes the windshield or other glass is greater than the outside air temperature, the heater operates, the blower speed is set to high, and heated air is directed to the windshield or other glass for de-fogging or de-frosting (step 240) while the strategy proceeds to determine if temperature/relative humidity in a selected zone or zones is within the comfort zone (step 242). Heating of glass continues until de-fog/de-frost has been completed, as determined by a sensor at or near the glass.

If temperature/relative humidity of inside air are within the comfort zone as determined by step 242, the occupant compartment interior is ventilated but neither the heater nor the cooler operates (reference numerals 244, 246, 248).

However, if inside air temperature is less than the lower temperature boundary of the comfort zone, the heater operates to bring temperature/relative humidity of inside air into the comfort zone (step 250) using calculations previously discussed (reference numerals 252, 254). Airflow to a selected zone or zones, and possibly selected locations within such zones) is controlled by blower speed.

When inside air temperature is greater than the upper temperature boundary of the comfort zone (i.e., too warm), one of two series of steps 256, 258 shown in FIG. 10 is performed. If inside air is too humid, series 256 is performed, and if inside air is too dry, series 258 is performed.

If inside air is too humid, temperature of the cooler (evaporator) is controlled to a controlled temperature which is less than the calculated dew point temperature such that the magnitude of the difference between the calculated dew point temperature and temperature measured by evaporator temperature sensor is not greater than a defined temperature difference (step 260). The following steps of series 256 (steps 262, 264, 266, 268, 270, 272, and 274) can be understood from earlier description of system operation. When the target temperature/relative humidity has been reached, cooling is terminated, and cooling will also be terminated if the engine is turned off (step 276).

If inside air is too dry, temperature of the cooler (evaporator) is controlled to correspond to temperature of inside air (step 278). Under most conditions, an evaporator temperature of about 60° F. is below the dew point temperature of occupant compartment air, and humidity will be sufficiently reduced to achieve comfort.

The following steps of series 258 (steps 280, 282, 284, 286, 288, 290, and 292) can be understood from earlier description of system operation. When the target temperature has been reached, cooling is terminated. Cooling will also be terminated if the engine is turned off (step 294).

What is claimed is:

1. A land vehicle comprising:
a powertrain comprising a motor for propelling the vehicle on land;
an occupant compartment for at least one occupant;
a climate control system for conditioning inside air within the occupant compartment, the climate control system having an air handler comprising a primary airway having an entrance, a blower fan for drawing air into the entrance and moving air through the primary airway and into the occupant compartment, a cooler for removing thermal energy from air moving through the primary airway, a heater for adding thermal energy to air moving through the primary airway, a first temperature sensor and a relative humidity sensor disposed to measure temperature and relative humidity of inside air, and a second temperature sensor for measuring surface temperature of the cooler; and
a controller for 1) calculating the dew point temperature of air from temperature measured by the first temperature sensor and relative humidity measured by the relative humidity sensor, 2) using the calculated dew point temperature to control surface temperature of the cooler to a controlled temperature, and 3) controlling temperature and relative humidity of inside air to achieve temperature and relative humidity within an area of a comfort zone, the comfort zone being bounded by a high temperature boundary, a low temperature boundary, a high relative humidity boundary, and a low relative humidity boundary, in which the first temperature sensor and the relative humidity sensor are disposed at an entrance of the primary airway, and the air handler comprises a damper upstream of the first temperature sensor and the relative humidity sensor for selecting air which flows into the entrance of the primary airway from one or both inside air and outside air which is outside the occupant compartment, the air handler also comprises a secondary airway in parallel with the primary airway, the secondary airway having an entrance through which inside air enters the secondary airway and is drawn through the secondary airway by the blower fan, a damper for controlling flow of inside air through the secondary airway, and an air distributor through which inside air which has passed through primary airway and inside air which has passed through secondary airway are introduced into the occupant compartment, the controller uses the calculated dew point temperature to control surface temperature of the cooler to a controlled temperature which is less than the calculated dew point temperature such that the magnitude of the difference between the calculated dew point temperature and temperature measured by the second temperature sensor is not greater than a defined temperature difference, and in which the controller is operable to cause the damper which controls flow of inside air through the secondary airway to block flow of inside air through the secondary airway until air entering the primary airway has one of temperature and relative humidity within the area of the comfort zone and then when the primary airway has one of temperature and relative humidity within the area, to cause the damper which controls flow of inside air through the secondary airway to allow at least some flow through the secondary airway.

2. The land vehicle set forth in claim 1 including an energy recovery and storage system for recovering what would otherwise be waste energy recovered during certain modes of vehicle operation and storing recovered energy as electric charge in a charge storage device.

3. The land vehicle set forth in claim 2 in which the energy recovery and storage system comprises a motor-generator which is selectively operable as a generator to charge the charge storage device when recovering what would otherwise be waste energy and as a motor operated by electricity from the charge storage device to deliver torque to the engine when excess energy is available from the charge storage device.

4. The land vehicle set forth in claim 3 in which the vehicle comprises a cruise control system, and the energy recovery and storage system is selectively operable by the controller as a generator to charge the charge storage device when the cruise control system discloses a positive error signal.

5. The land vehicle set forth in claim 3 in which the vehicle comprises a GPS system, and the energy recovery and storage system is selectively operable by the controller as a generator to charge the charge storage device when the vehicle is traveling along a road which the GPS system has disclosed to be favorable for energy recovery.

6. The land vehicle set forth in claim 1 in which the cooler comprises an evaporator of a refrigeration system having a compressor which is operable to circulate refrigerant in the refrigeration system, and further including an electric motor which operates the compressor.

7. The land vehicle set forth in claim 6 in which the heater comprises an electric heater.

8. The land vehicle set forth in claim 7 further comprising an outside air temperature sensor for measuring temperature of air which is outside the occupant compartment and an outside air relative humidity sensor for measuring relative humidity of air which is outside the occupant compartment, and in which the controller uses temperature and relative humidity of outside air in controlling temperature and relative humidity of inside air.

9. The land vehicle set forth in claim 1 further comprising a wireless control device for wirelessly communicating with the controller to set certain parameters of operation for the climate control system.

10. The land vehicle set forth in claim 9 in which the parameters of operation which the wireless control device can set include at least one of a target temperature, a target relative humidity, and a target zone of the occupant compartment.

11. The land vehicle set forth in claim 1 further comprising a high-voltage energy storage device and a low-voltage energy storage device and in which an electric motor operates the compressor at high-voltage and the controller operates at low-voltage.

12. The land vehicle set forth in claim 11 further comprising a solar array which is disposed to capture incident solar energy and convert captured solar energy into electricity which is stored in the high-voltage energy storage device.

13. The land vehicle set forth in claim 1 in which the controller comprises a control strategy for selecting a particular one of different cooler control strategies for controlling surface temperature of the cooler to a controlled temperature.

14. The land vehicle set forth in claim 13 in which the different cooler control strategies are each based on a different temperature/humidity condition of air outside the occupant compartment.

15. The land vehicle set forth in claim 13 in which the control strategy includes a ventilation strategy for ventilating the occupant compartment without operating the cooler.

* * * * *